United States Patent [19]

Mar et al.

[11] Patent Number: 4,641,844
[45] Date of Patent: Feb. 10, 1987

[54] BABYLER FOLDING BABY STROLLER FOR MULTIPLE USES

[76] Inventors: Shih-Lin Mar, 3rd Fl., No. 10, Lane 134, Tzu-Li Str., Hsintien, Taipei Hsien; Long-Cho Kuo, No. 20, Chung-Hsiao Rd., Ma-Dou Jenn, Tainan Hsien, both of Taiwan

[21] Appl. No.: 835,427

[22] Filed: Mar. 3, 1986

Related U.S. Application Data

[63] Continuation of Ser. No. 558,054, Dec. 5, 1983, abandoned.

[51] Int. Cl.$^4$ .............................................. B62B 7/12
[52] U.S. Cl. .................................... 280/30; 280/643; 280/648
[58] Field of Search ............... 280/30, 638, 639, 641, 280/642, 643, 644, 647, 648, 650, 655, 47.37 R, 47.38, 47.4; 297/DIG. 4

[56] References Cited

U.S. PATENT DOCUMENTS

| 2,470,040 | 5/1949 | Mackin | 280/643 |
| 3,550,997 | 12/1970 | Strand | 280/30 |
| 3,944,241 | 3/1976 | Epelbaum | 280/30 |
| 3,984,115 | 10/1976 | Miller | 280/30 |
| 4,132,429 | 1/1979 | Woods | 280/650 |

FOREIGN PATENT DOCUMENTS

2274490 1/1976 France .............................. 280/643

Primary Examiner—John J. Love
Assistant Examiner—Michael Mar
Attorney, Agent, or Firm—Balogh, Osann, Kramer, Dvorak, Genova & Traub

[57] ABSTRACT

A multi-purpose foldable stroller for an infant, which has a retractable pushing bar and a folding rear rod to permit conversion into a baby holder, back-mounted infant carrier, an infant seat or car seat, or an infant bed and being of light weight, safe, portable, and being readily storable.

1 Claim, 10 Drawing Figures

BABYLER FOLDING BABY STROLLER FOR MULTIPLE USES

This application is a continuation of application Ser. No. 558,054, filed Dec. 5, 1983, now abandoned.

BACKGROUND OF THE INVENTION

As a result of our material civilization moving forwards with each passing day, the care to our babies become more particular; various types of new toys and other articles for the baby have been developed one after another. In the market, although there are many different baby carriages and baby carriers, there is very difficult to spot an ideal baby carrier which has a versatile uses. Most of the existing baby carriage and baby carrier can not adapt to many occasions because of the designing drawbacks; from time to time, the user of the baby carriage or baby carrier really does not know how to handle them in many occasions, such as during excursion, driving a car, and other outdoor activities, etc. As a result, carrying a baby in an uncomfortable way may annoy the parents, and prevents them from enjoying the outdoor activities. Therefore, the contemporary industries should urgently set a target to develop a baby stroller that may be used for many purposes, having better safety, at a lower cost and being portable.

BRIEF SUMMARY OF THE INVENTION

This invention relates to a folding baby stroller that may be used for various occasions. The carrying chair of this invention may be made of plastics or glass fiber; further, it comprises joint assemblies connecting pivot assemblies, supports, and castors, etc. This baby stroller may be used as a baby carrier, baby holder, baby seat, baby bed, baby carrier, and baby car seat in a safe and comfortable manner. Further, the baby carrier of the present invention is light and durable, portable, and easy to store, i.e., a novel and practical baby stroller.

By referring to the various information collected regarding the baby carriage, the baby carrier, and the safety regulations, the inventor has developed this novel carrier, which has versatile functions, such as being used as a baby carrier, stroller, car seat, baby bed, and baby holder, etc.

The main feature of the present invention is the movable and folding joint structure in the middle of the rear rod. It is the sleeve on the rear rod, which can be retracted back and forth to make the rear rod become straight or folding up. Upon the rear rod being folded up, the rear castors are put closely to the both sides of the carrying chair back so as to adapt to various conversions and to reduce its size for portable and storing conveniences.

Another feature of the present invention is the pushing bar structure, which is retractable, and may be fixed by means of a pushing bar sleeve and an eccentric cam so as to have the tength of the pushing bar adjusted at a desired length.

Still another feature of the present invention is the arc-shaped front edge of the carriage chair bottom, which can adapt closely and comfortably to the back curve of a carrying person.

BRIEF DESCRIPTION OF THE DRAWINGS

FIG. 3-1 is a sectional view of the rear rod in the present invention.

FIG. 3-2 is an exploded view of the rear rod in the present invention.

DETAILED DESCRIPTION

Figure 1:
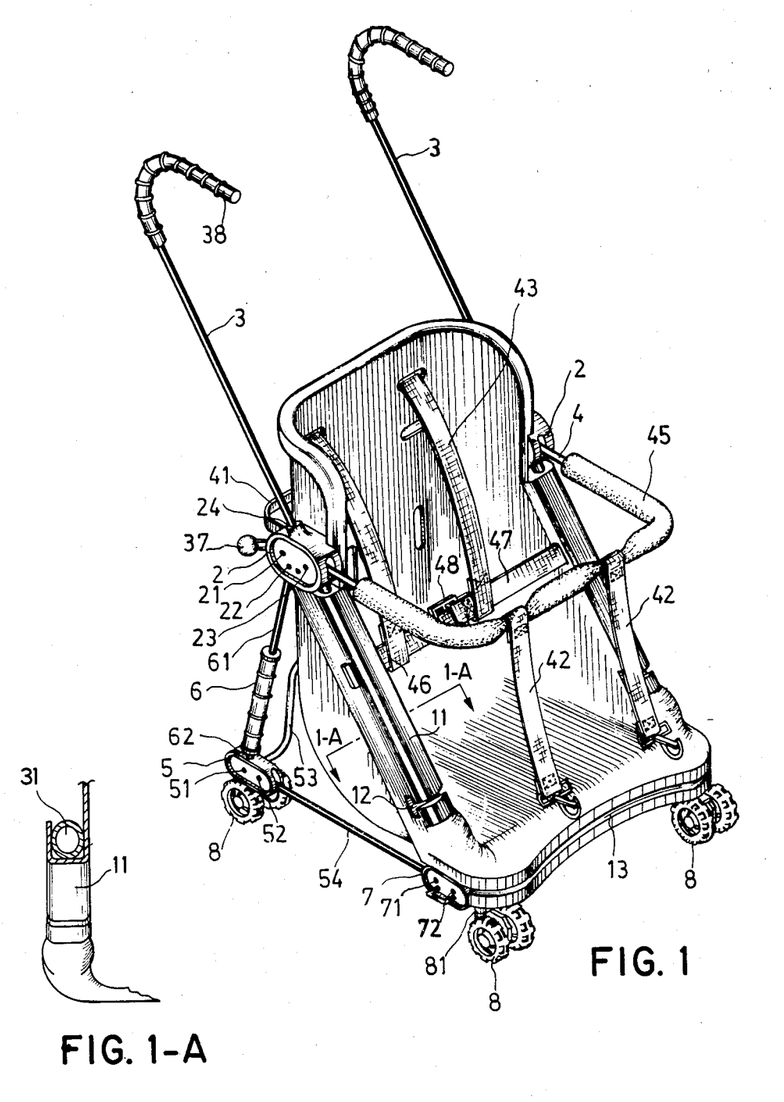
FIG. 1 is a perspective view of the present invention.

The specific structure and the various embodiment of the present invention are further described in detail, by referring to the drawings attached, as follows:

Referring to FIG. 1, there is shown a perspective view of the present invention, in which the form of the carrying chair 1 is designed in accordance with human engineering so as to comply with all applicable federal motor vehicle safety standards; the arm-rest-like side member of the carrying chair 11 is a hollow tube member having a safety belt retaining slot 12 at its lower part for retaining a safety belt therein (not shown in the Fig.). The front edge of the carrying chair is formed into an arc-shaped edge 13 so as to adapt to the curve of the carrying person's back for stable and comfort's sake. On the back of the carrying chair, there is furnished a back net 14 (shown in FIG. 6), of which the opening edge is knitted with a elastic cord so as to make the opening being elastic.

At the front bottom of the carrying chair, there is furnished a retractable base support 15 (shown in FIG. 4), which is used for extending on the ground or other spot to increase the stability of the carrying chair. On each top of the two side members of the carrying chair, there is furnished a connecting pivot assembly 2, which is in an oval shape, being fixedly attached to the carrying chair 1. The connecting pivot assembly 2 includes three pivots, i.e., the rear bar connecting pivot 21, the rear rod connecting pivot 22, and the front bar connecting pivot 23, and a pushing bar extension hole 24 being used for fixing the pushing bar 3, and a control bar 37, which is used for locking the pushing bar 3 in position. The front bar 4 is a U-shaped bar, of which the both ends are pivoted to a connecting pivot assembly 2; the outer surface of that front bar 4 is covered with a layer of sponge protection sleeve 45 for protecting the body from impact and two carrying belts 42 to facilitate a person carrying the chair on the back. The rear bar 41 is made of a U-shaped metal strip, of which the both ends are pivoted to the connecting pivot assembly 2; that bar 41 is mounted on the back of the carrying chair 1 for additional safety sake. The safety belt 43 is fixed with one end to the upper back portion of the carrying chair, while the other end forms a loop 46 which is penetrated with a horizontal belt 47 being fixed to the both sides of the carrying chair 1; the horizontal belt 47 is furnished with a buckle 48 for adjusting length of the belt so as to adequately hold the baby in position for safety sake. The rear rod includes the front section of the rear rod 61, the rear section of the rear rod 62, which are connected with a joint, and are secured in position with a rear rod sleeve 6. That rear rod may be folded from its joint portion; for detailed description, see FIG. 3. The connecting pivot assembly 5 (FIG. 4) is fixedly attached in the middle portion of the rear section of rear rod 62 so as to change its direction by following the movement of the rear section of rear rod 62, of which the lower end is mounted with a caster 8. The connecting pivot assembly 5 is furnished with a movable bottom rod connecting pivot 52 for pivotally connecting the bottom rod 54. There are two connecting pivot assemblies 5 being symmetrically mounted on the both sides of the carrying chair at a fixed distance between them, which are connected with a rear caster connecting rod 53, which is bent into a U-shaped form, being made of metal, and which may be used for supporting the carrying chair against the ground during a certain occasion for stable function. Another two connecting pivot assemblies 7 are fixedly mounted, with a fixed pivot 72, on the two front bottom sides of the carrying chair respectively. The bottom rod connecting pivot 71 of that connecting pivot assembly 7 is used for connecting rod 54.

In the whole baby carrier, the connecting pivot assemblies 2 and 7 are fixed in position to form a triangle frame with the connecting pivot assembly 5 for stable purpose. The castors 8 are mounted under the four corners of the carrying chair, and the two front castors 8 are rotatively (360°) mounted for steering purpose.

Figure 2:
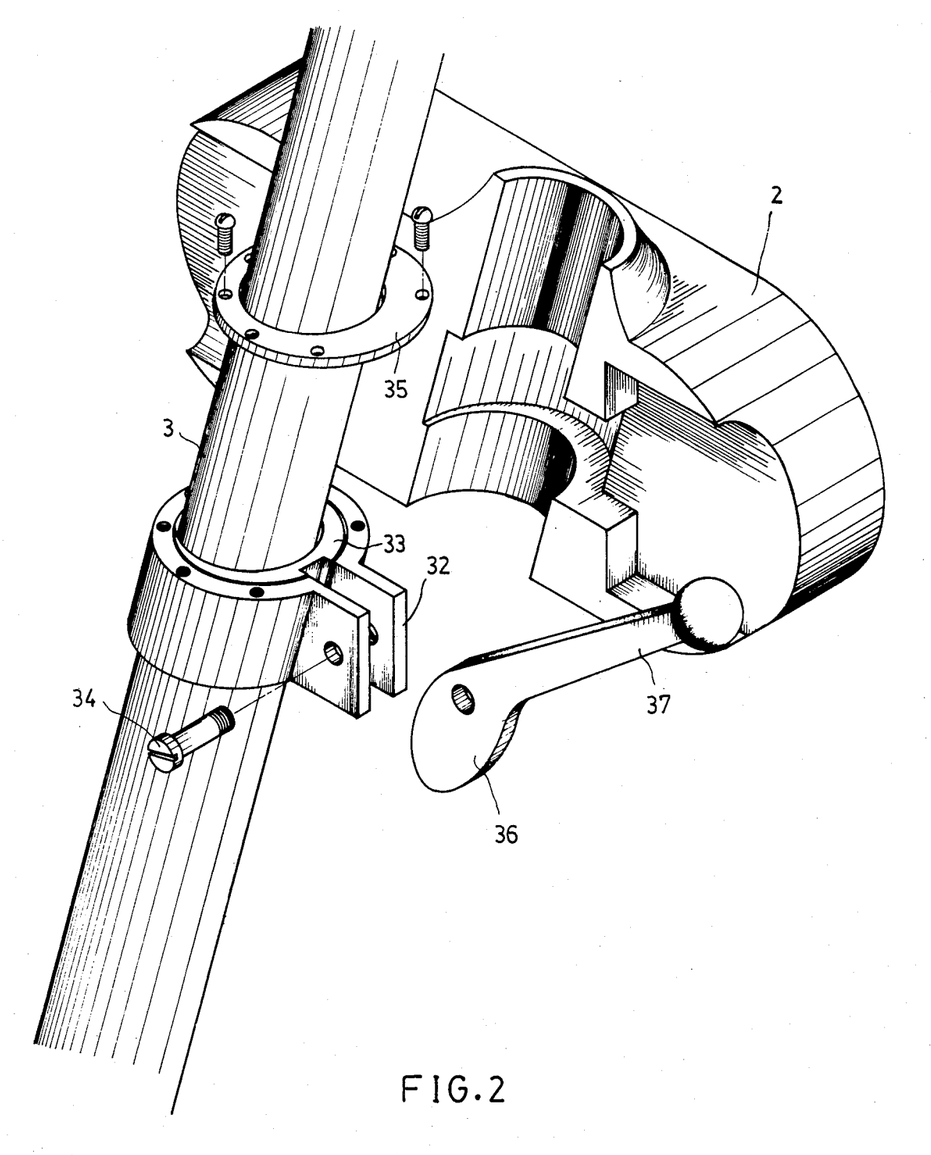
FIG. 2 is an exploded view of the handle of the pushing bar in the present invention.

FIG. 2 is an exploded view of the pushing bar 3, which is made of metal; the pushing bar sleeve 31 is mounted inside the side member of the carrying chair 11, and is used for providing an extension means for the pushing bar 3. The joint portion between the pushing bar 3 and the pushing bar sleeve 31 is mounted inside the connecting pivot assembly 2 shown in FIG. 1. On the top of the pushing bar sleeve 31, there is furnished a base of clamp 32 that is made of hard material. The inner diameter of oval space is larger than that of the pushing bar, and in that space, there is mounted a clamp 33 made of a material having higher friction coefficient. That clamp 33 is sleeved over the pushing bar 3 with a suitable space between them. A sealing lid 35 having a hole with a diameter almost equal to that of the pushing bar 3 is sleeved over the pushing bar 3 and is fixed to the base of clamp 32 by means of a screw; the function of the sealing lid 35 is to combine with the pushing bar sleeve 31 to have the clamp sealed inside the base of clamp 32. On the base of clamp 32, there is furnished a control bar 37, of which one end is formed into eccentric cam 36, while the other end is formed into a handle. That control bar 37 is pivoted in the outer opening of the base of clamp 32 with a bolt 34. The aforesaid whole mechanism is enclosed inside the connecting pivot assembly 2 except the control bar 37, which is left outside for operating convenience. In operation, lift the control bar 37 upwards so as to have the small diameter portion of the eccentric cam 36 face the clamp 33 and to let the clamp 33 move outwards for releasing the pushing bar 3. Upon the pushing bar 3 being adjusted to a given length desired, push the control bar 37 downwards so as to have the eccentric cam 36 press against the clamp 33, which will, in turn, press towards the pushing bar 3. Since the space for the pushing bar 3 has been set with the pushing bar sleeve 31 and the sealing lid 35, and since the clamp 33 is being pressed towards the pushing bar 3, the very terminal portion of clamp 33 is pushed into the space between the pushing bar 3 and the base of clamp 32; as a result of clamp 33 made of a material having higher friction coefficient, the pushing bar 3 will be fixed in position without moving up or down.

Figure 3:
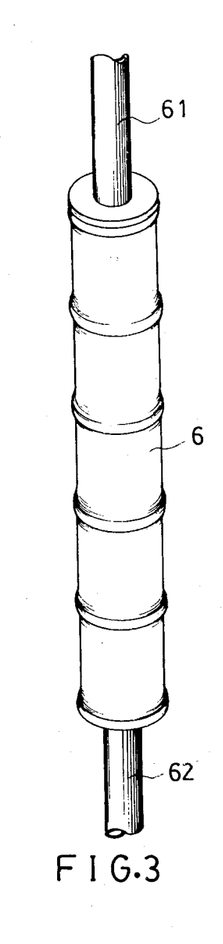
FIG. 3 is the outer view of the rod joint in the present invention.
Figure 31:
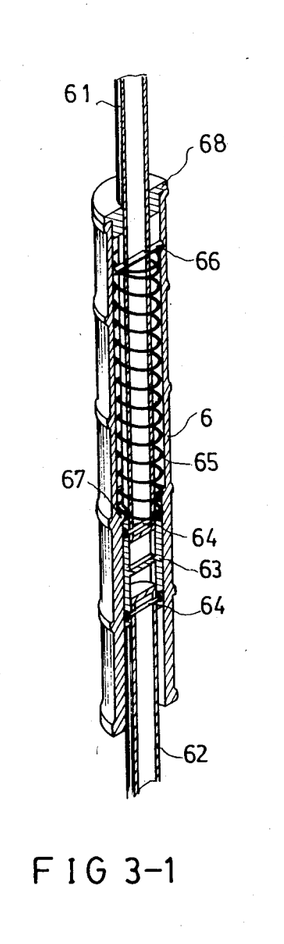
Figure 32:
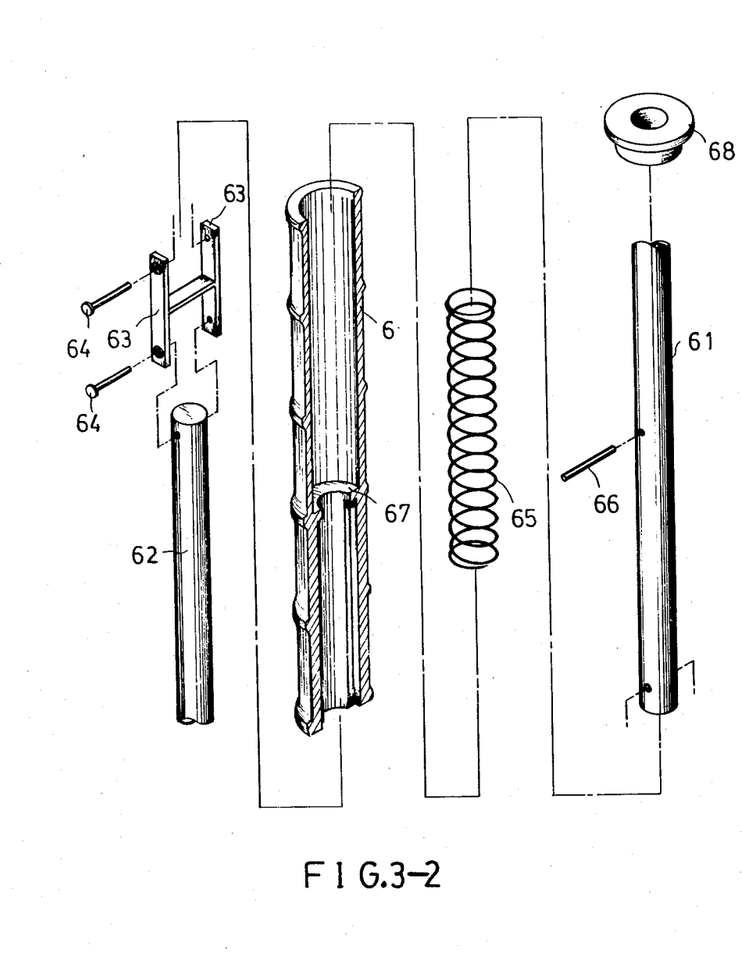

Referring to FIG. 3, there is shown an outer view of the rear rod in the present invention, which is formed with the front section of rear rod 61 and the rear section of rear rod 62, which are then bound together with a rear rod sleeve 6. FIGS. 3-1 and 3-2 are the sectional view and the exploded view of FIG. 3. In those Figures, there are shown a front section of rear rod 61 and a rear section of rear rod 62 being connected with a joint plate 63 and a joint pivot 64 so as to have the two sections folded to either direction. Spring 65 is to be sleeved over the front section of rear rod 61, and is limited with a spring retaining pin 66. The rear rod sleeve 6 is an important member, which is sleeved over the joint portion of the two section 61 and 62. Inside the sleeve 6, the diameter of the front section is larger than that of the rear section, and between the front and the rear sections, there is furnished an inner stop ring 67, of which one side retains the spring 65, while the other side retains the joint plate 63. There is a sleep cap 68 to be mounted over the front section of the rear rod. The function of the whole assembly is to have the two sections 61 and 62 folded up by moving the rear rod sleeve 6 forwards to compress the spring 65 until the joint portion sliding out of the rear rod sleeve 6 so as to fulfil the functions designed in the present invention. In the event of requiring the two sections of the rear rod restoring to a straight rod, align the said two sections 61 and 62 into a straight line, the sleeve 6 will automatically be thrown back to its original position to maintain the rear rod in a straight manner.

Figure 4:
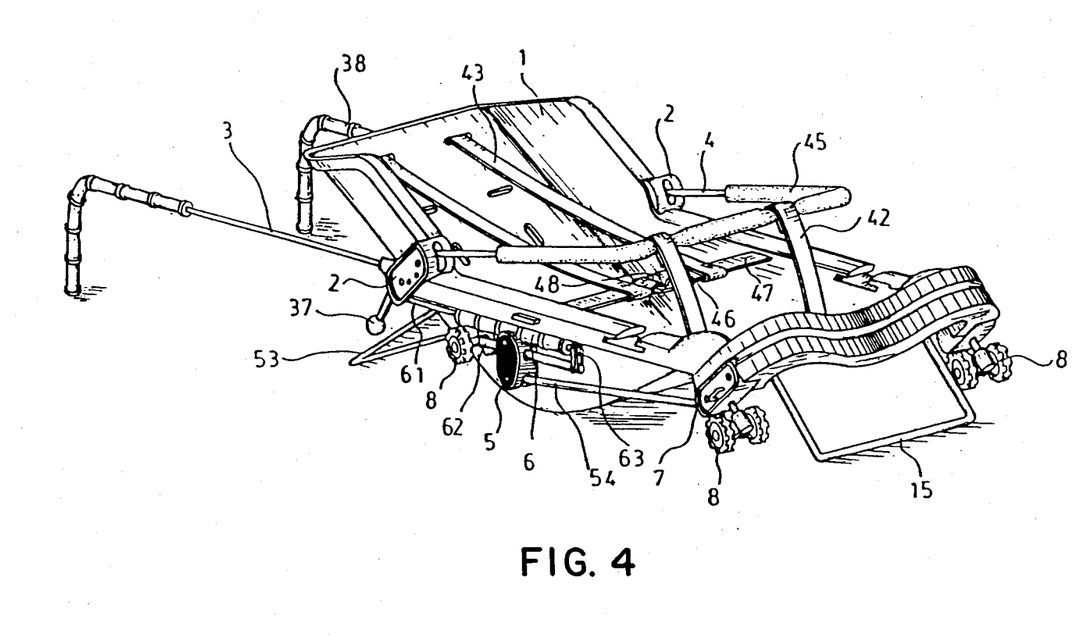
FIG. 4 is a view showing the present invention being re-arranged into a bed-like form to be placed on the ground.

FIG. 4 is a view showing the present invention being re-set up as a bed-like form to be placed on the ground, in which the rear rod is folded up, after the sleeve 6 being pushed upwards and over the front section 61 to have the joint portion moved outside the sleeve 6; now the rear caster 8 are hanging in the air; simultaneously, the pushing bars 3 are maintained in the original extending manner, but let the handles 38 touch the ground surface. The whole carrying chair 1 set up can be used as a baby bed. Further, the base support 15 and the rear caster connecting bar 53 and the handles 38 may be pulled out to touch the ground surface so as to maintain the baby carrier in a stable manner.

Figure 5:
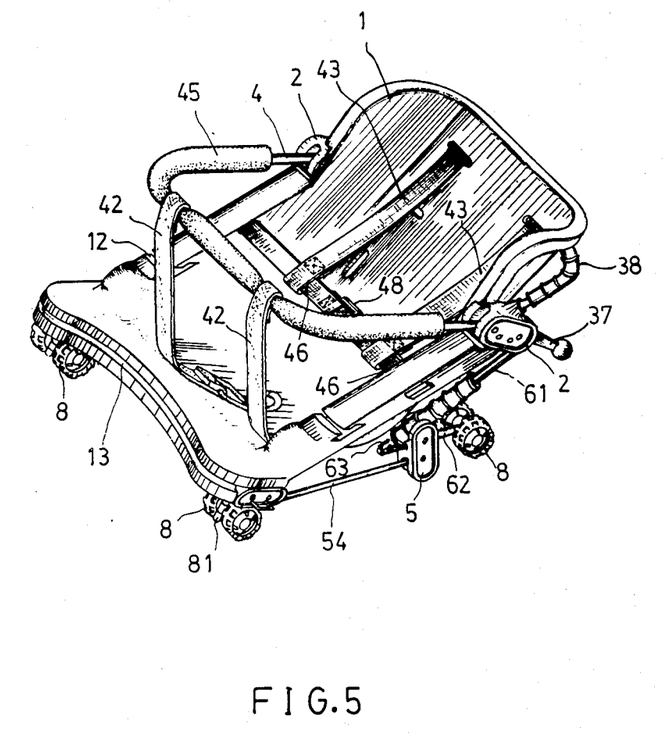
FIG. 5 is a retracted view of the present invention ready to be held with arms.

FIG. 5 is a view showing the present invention being held with hands by a person; the arrangement of the baby carrier is similar to the view in FIG. 4 except the pushing bars being retracted inside the pushing bar sleeve 31 and the handles 38 being put inside the back net 14 (not shown in FIG. 5). Since the whole carrier is made of light and tough material, there will be no difficulty to hold the carrier walking around.

Figure 6:
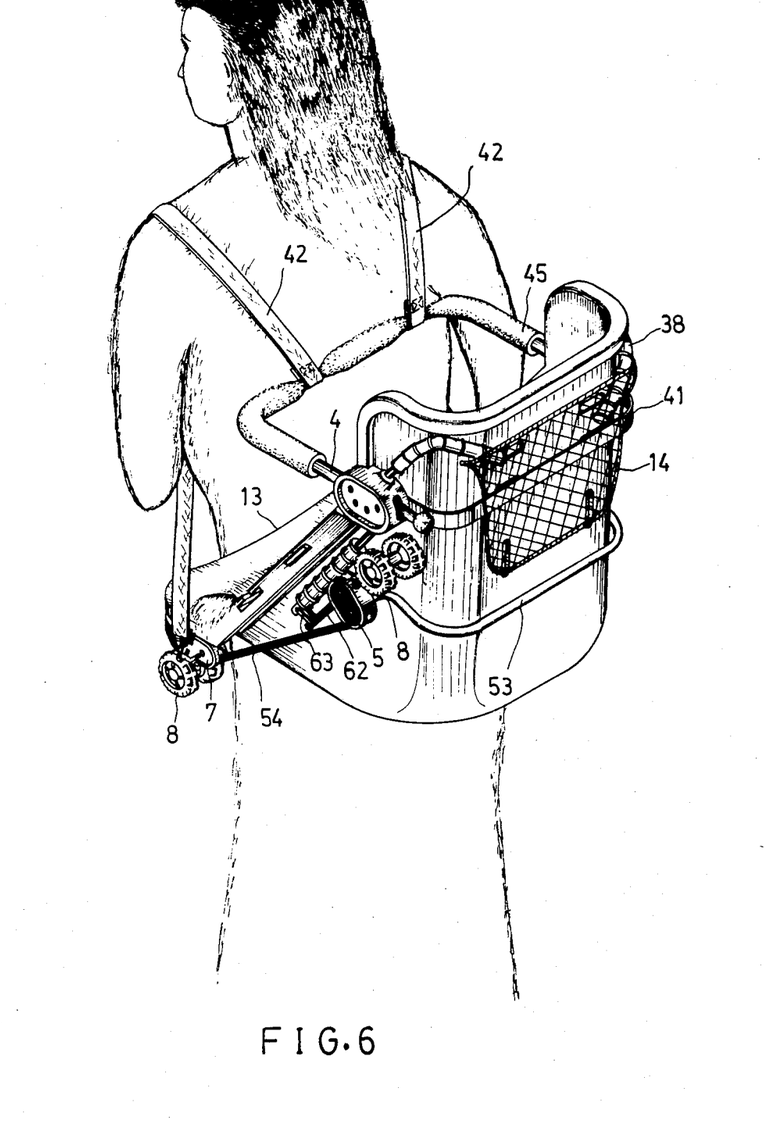
FIG. 6 is a back-carrying view of the present invention.

FIG. 6 is a view showing the present invention being carried on the back. From this Fig, it is shown that the handles 38 are retained in the back net 14, and that the baby carrier is carried on the back with the carrying belt 42. The arc-shaped front edge 13 of the carrying chair 1 is adapted to the person's back in a comfortable manner, while the baby sits comfortably in the carrying chair 1 securely.

Figure 7:
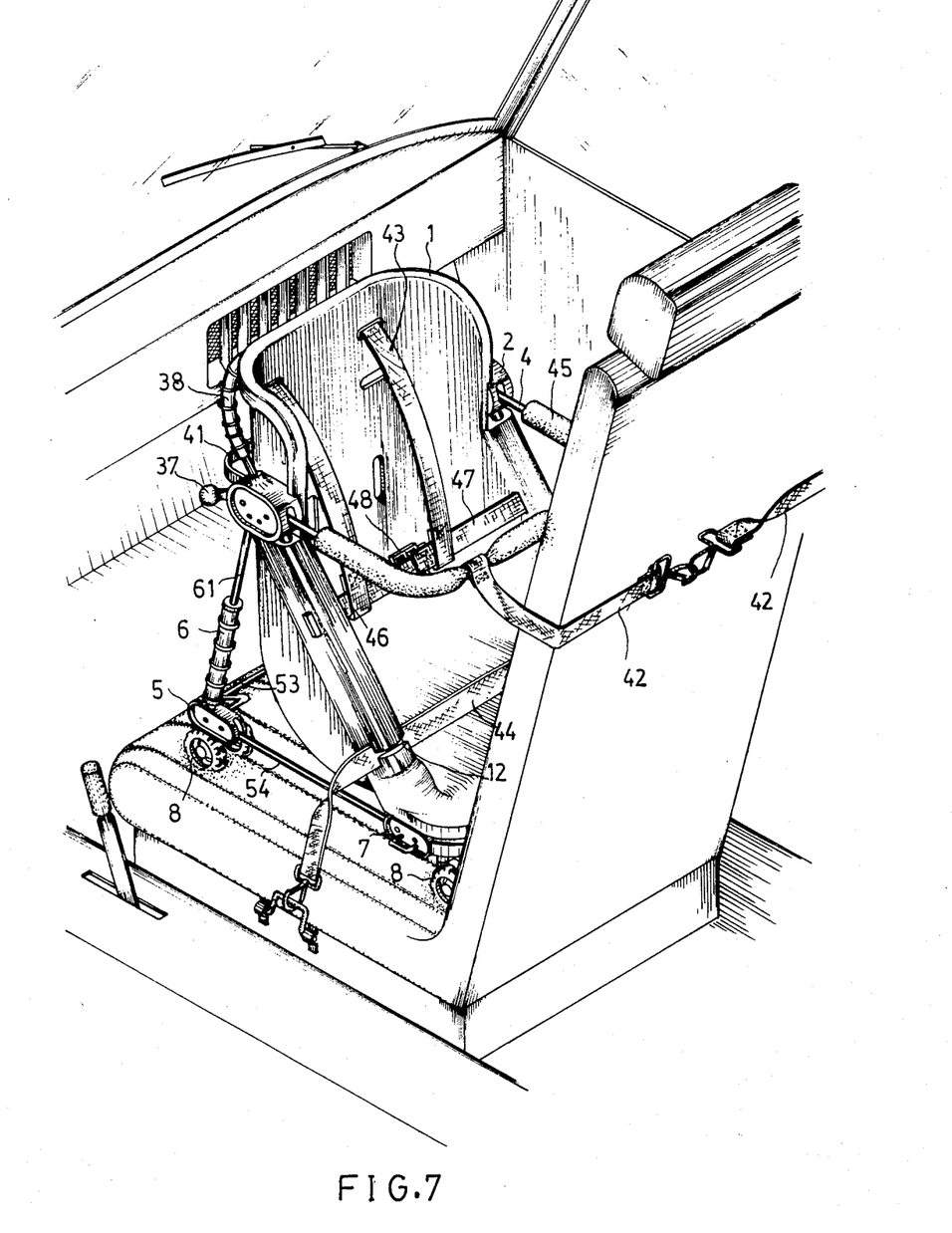
FIG. 7 is a view showing the present invention being mounted on the seat of car.

FIG. 7 is a view showing the present invention being mounted on the car seat in which the rear rod is set straightly so as to have the whole carrying chair set up in a vertical position, and the four castors 8 rest on the car seat; put the carrying belt 42 around the car seat and buckle it on the back; the seat belt 44 is passing through the safety belt retaining slot 12, and then is buckled to the both sides of car seat so as to have the baby carrier of the present invention mounted on the car seat securely. The rear castor connecting rod 53 may be pulled out at a suitable angle to rest on the car seat so as to prevent the baby carrier from sliding movement in order to obtain more security in the car for the baby.

Figure 8:
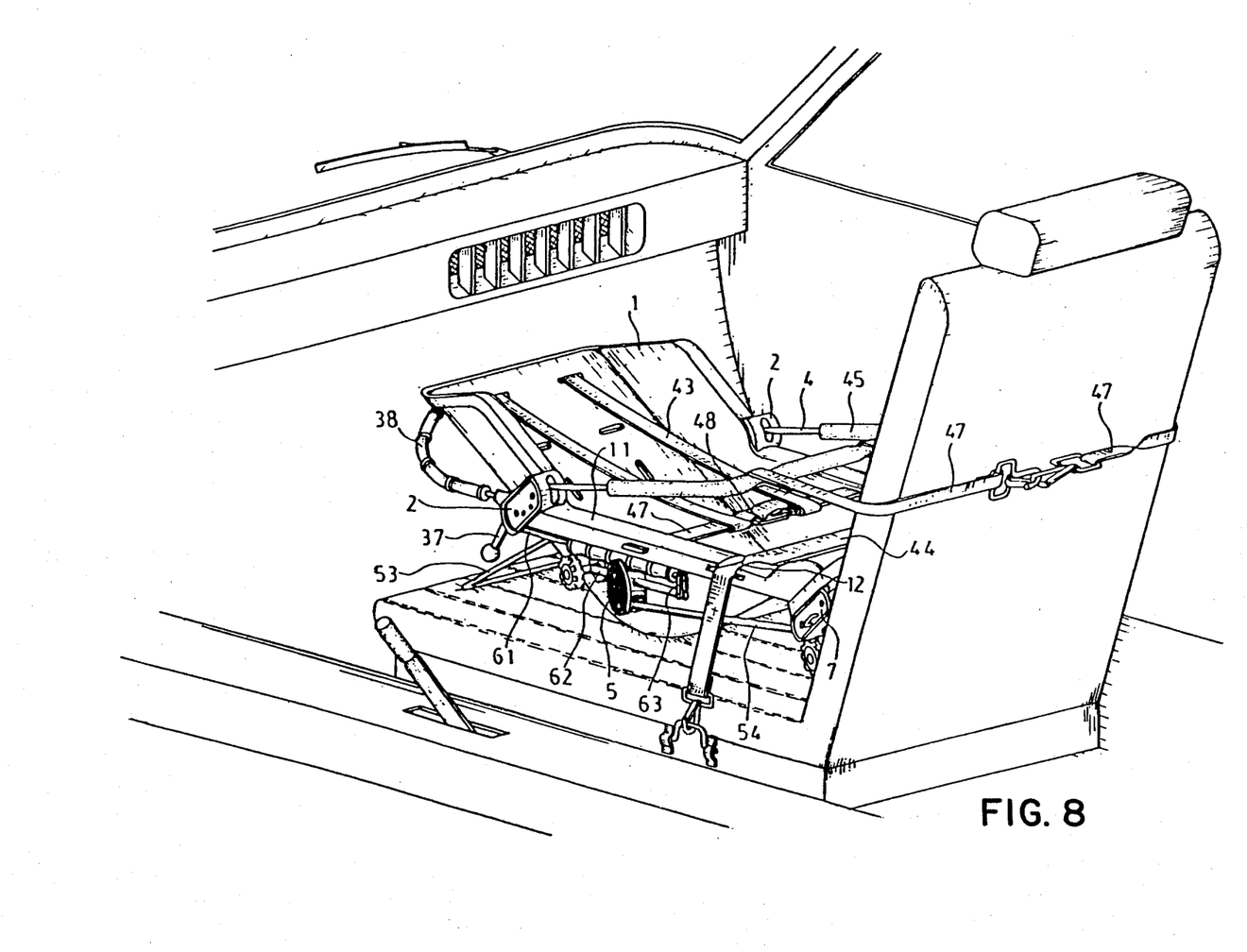
FIG. 8 is a view showing the present invention being mounted on car seat in a flat or bed-like manner.
Figure 9:
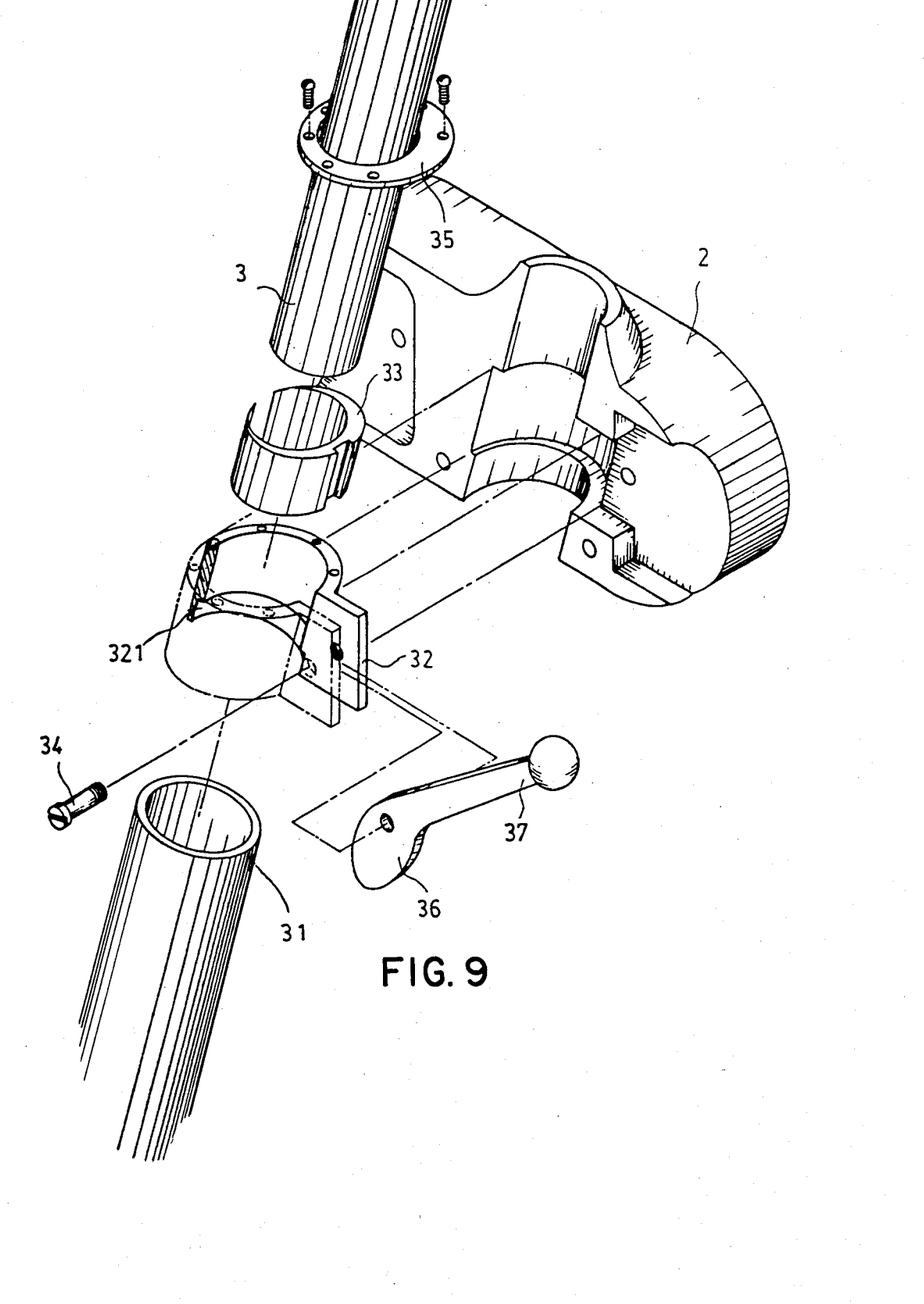
FIG. 9 is an exploded view of the assembly shown in FIG. 2.

FIG. 8 is a view showing the present invention being mounted on a car seat in a flat or bed-like manner, in which the rear rods are folded up so as to have the baby carrier become an improvised baby bed. The present invention may be so mounted on a car seat as to let the baby face forwards; in that case, the handles 38 should be fastened on the car seat with the safety belt.

For further clarification, it can be explained that FIG. 2 is an exploded view, in which the top of the pushing bar sleeve 31 is furnished with a base clamp 32, and in the bottom end about a ⅓ portion of that base clamp 32, there is provided a groove 321. The top end of the pushing bar sleeve 31 can exactly be engaged in the groove 321 so as not to move upwards any further. On the inner side of the base of clamp 32, there is furnished a clamp 33 made of flexible plastic material. The pushing bar 3 is mounted through the clamp 33 which is positioned on the outer side of the pushing bar 3. An end of the pushing bar 3 is put inside the pushing bar sleeve 31. Small holes on the sealing lid 35 admit screws which secure the lid 35 on the top of the base of clamp 32. The bolt 34 is used for fixing the control bar 37 at one end of the base of clamp 32, while the base of clamp 32 is positioned on the top of the pushing bar sleeve 31. The base of clamp 32 is fixed in the groove of the pivot assembly 2, while the control bar 37 extends outside for hand operation. In operation, a person pulls the control bar 37 upwards to have the eccentric cam 36 moved downwards and outwards in order to prevent it from pressing the clamp 33 (i.e., the clamp 33 will not be affected by the inward pushing force of the eccentric cam 36, but is in a relaxed position). The pushing bar 3 may be adjusted to extend out or to retract into the pushing bar sleeve 31 so as to obtain a suitable position. Then, pull the control bar 37 downwards to have the eccentric cam 36 moved inwards to press the clamp 33 so as to tightly clamp the pushing bar 3 inwards without moving upwards or downwards, and moving forward.

We claim:

1. A folding baby stroller for multiple uses comprising:
   a carrying chair which includes two flanged side members,
   a front bottom edge formed into an arc-shaped member to adapt to back carrying,
   a movable base support at the bottom of said chair,
   a back net,
   a safety belt attached to the back of said chair,
   an upper pair of fixed connecting assemblies attached to sides of said chair,
   a lower pair of fixed connecting assemblies attached to forward sides of said chair,
   a pair of movable connecting pivot assemblies,
   a rear bar and a front bar, each being connected to said upper pair of fixed connecting assemblies, each member of which pair includes a pushing bar extension hole,
   said front bar being of U-shape, and being made of metal, and being mounted on the front of said chair, and having its surface covered with a sponge layer,
   a safety belt attached to said chair,
   a pair of rear rods interconnecting said upper pair of fixed connecting assemblies, and said pair of movable connecting pivot assemblies,
   a pair of bottom rods interconnecting said lower pair of fixed connecting assemblies, and said pair of movable connecting assemblies,
   a pair of pushing bar means interconnected with said upper pair of fixed connecting assemblies,
   control and connecting means integral with said upper pair of fixed connecting assemblies for locking the position of said pushing bar means,
   said control and connecting means having a clamp, and an adjustable control arm, and a push-bar-means-engaging eccentric cam,
   rear rod means interconnecting said upper pair of fixed connecting assemblies, and said pair of movable connecting pivot assemblies, and being formed of pivotably interconnected foldable sections,
   a sleeve means for slidably carrying said rear rod means,
   a spring within said sleeve means for urging said rear rod means in one direction,
   a pair of bottom rods connected between said lower pair of fixed connecting assemblies, and said pair of movable connecting pivot assemblies, and
   a rear connecting rod interconnecting members of said pair of movable connecting pivot assemblies.

* * * * *